(12) United States Patent
Nanataki et al.

(10) Patent No.: US 8,272,223 B2
(45) Date of Patent: *Sep. 25, 2012

(54) TWIN-SHAFT GAS TURBINE INCLUDING A CONTROL SYSTEM FOR ADJUSTING THE COMPRESSOR INLET GUIDE VANE ANGLE TO OPTIMIZE ENGINE TRANSIENT RESPONSE

(75) Inventors: Kenji Nanataki, Hitachi (JP); Nozomi Saito, Hitachinaka (JP); Hidetaro Murata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/980,120

(22) Filed: Dec. 28, 2010

(65) Prior Publication Data

US 2011/0126547 A1 Jun. 2, 2011

Related U.S. Application Data

(62) Division of application No. 12/493,351, filed on Jun. 29, 2009, now Pat. No. 8,196,414.

(30) Foreign Application Priority Data

Jul. 10, 2008 (JP) ................................. 2008-180432

(51) Int. Cl.
*F02C 9/00* (2006.01)
(52) U.S. Cl. ............. 60/794; 60/793; 60/39.24; 60/779; 60/39.091; 60/39.27
(58) Field of Classification Search .................... 60/773, 60/778, 779, 39.091, 39.23, 794, 793, 39.24, 60/39.27, 795, 782, 785
See application file for complete search history.

(56) References Cited

U.S. PATENT DOCUMENTS

| 4,299,088 A * | 11/1981 | Rowen et al. ................ 60/39.27 |
| 4,428,194 A * | 1/1984 | Stokes et al. .................... 60/779 |
| 4,539,810 A * | 9/1985 | Watanabe ........................ 60/791 |
| 4,809,497 A * | 3/1989 | Schuh .......................... 60/39.27 |
| 4,864,816 A | 9/1989 | Benvenuti et al. |
| 6,735,955 B2 * | 5/2004 | Mannarino ..................... 60/794 |
| 6,758,044 B2 * | 7/2004 | Mannarino ..................... 60/773 |
| 2009/0071165 A1 * | 3/2009 | Matz et al. ...................... 60/772 |

FOREIGN PATENT DOCUMENTS

| DE | 28 02 785 A | 8/1978 |
| EP | 279 487 A | 8/1988 |
| GB | 2 119 862 A | 11/1983 |
| JP | 63-212725 A | 9/1988 |
| JP | 3-172540 A | 7/1991 |
| JP | 8-82228 A | 3/1996 |
| JP | 2007-40171 A | 2/2007 |

* cited by examiner

*Primary Examiner* — William H Rodriguez
(74) *Attorney, Agent, or Firm* — Mattingly & Malur, PC

(57) ABSTRACT

A twin-shaft gas turbine 1, which has a gas generator 2 including a compressor 7, a combustor 8, and a high-pressure turbine 9, is configured to make a first control mode and a second control mode selectively useable for control of the gas generator. In addition, in the first control mode, an IGV angle in the compressor is controlled in accordance with a corrected shaft rotation speed of the gas generator, and in the second control mode, the IGV angle is controlled to maintain a constant gas generator shaft rotation speed. Furthermore, the first control mode is used to start, to stop, and to operate the turbine under fixed or lower load conditions, and that the second control mode is used under operational states other than those to which the first control mode is applied.

6 Claims, 5 Drawing Sheets

PRIOR ART

TWIN-SHAFT GAS TURBINE INCLUDING A CONTROL SYSTEM FOR ADJUSTING THE COMPRESSOR INLET GUIDE VANE ANGLE TO OPTIMIZE ENGINE TRANSIENT RESPONSE

This is a divisional application of U.S. application Ser. No. 12/493,351, filed Jun. 29, 2009, the contents of which are hereby incorporated by reference into this application.

BACKGROUND OF THE INVENTION

1. Field of the Invention

The present invention relates generally to twin-shaft gas turbines, and more particularly, to controlling a gas generator in a twin-shaft gas turbine.

2. Description of the Related Art

Generally, a twin-shaft gas turbine includes a gas generator constituted by a compressor, a combustor, and a high-pressure turbine. This gas turbine also includes a low-pressure turbine (power turbine) connected to a load, with a gas generator shaft (a rotary shaft of the gas generator) being separated from a rotary shaft of the low-pressure turbine. In the gas generator, the compressor generates compressed air and supplies the compressed air to the combustor in which a fuel mixedly with the compressed air is then burned, thus combustion gases are generated. The combustion gases that have thus been produced by the combustor rotationally drive the high-pressure turbine to generate a driving force of the compressor. After this, the combustion gases are further sent to the low-pressure turbine to drive it for rotation.

In such conventional twin-shaft gas generator, control that provides angle control of the compressor inlet guide vane (IGV), based on a corrected rotation speed of the gas generator shaft, that is, corrected rotation speed responsive IGV angle control has been totally applied as most common gas-generator control, irrespective of an operational state of the gas generator.

The disclosures given in JP-2007-40171-A, JP-08-82228-A, and JP-63-212725-A, for instance, are known as examples of a twin-shaft gas generator.

SUMMARY OF THE INVENTION

As discussed above, corrected rotation speed responsive IGV angle control is conducted in the gas generator of the conventional twin-shaft gas generator specifications. In this case, as shown in FIG. 7A, the IGV angle changes according to the corrected rotation speed having a correlation with respect to an atmospheric temperature. As shown in FIG. 7B, therefore, lines of operation also change, which in turn changes the gas generator shaft rotation speed according to the atmospheric temperature. In addition, since positions on the lines of operation vary, the load or deterioration of the turbine further changes the gas generator shaft rotation speed.

These changes in the rotation speed of the gas generator shaft cause resonance problems. In other words, the changes in the rotation speed of the gas generator shaft make this shaft rotation speed more likely to approach a resonance rotation speed. As the shaft rotation speed actually approaches the resonance rotation speed, resonance arises and shaft vibration increases. Such a resonance problem as this becomes particularly serious during high-speed rotation under high load operating conditions, and the resonance under the high-speed rotational state enhances a possibility of damage to rotor blade of turbine or rotor blade of compressor. For these reasons, the control scheme that totally applies corrected rotation speed responsive IGV angle control has required imparting a structure for avoiding the resonance at the speed assumed, or imparting to rotor blade a structure that allows the rotor blade to withstand the resonance, and consequently, costs have increased.

The present invention has been made with a backdrop of the above circumstances, and an object of the invention is to effectively resolve resonance problems in a twin-shaft gas turbine, associated with changes in a rotation speed of a gas generator shaft, and more particularly, a resonance problem under a high-speed rotational state of the gas generator shaft.

Corrected rotation speed responsive IGV angle control is effective for avoiding compressor surging. However, in the regions that the shaft rotation speed of the compressor, or the rotation speed of the gas generator shaft, reaches a constant value or more, the compressor increases in stability and surging does not pose too serious a problem. Therefore, while corrected rotation speed responsive IGV angle control is required under a low-speed rotational state of the gas generator shaft, such IGV angle control is not always required during the high-speed rotational state of the gas generator shaft in the regions that the stability of the compressor is ensured. The resonance problem, on one hand, becomes serious during such high-speed rotation of the gas generator shaft as in the regions that compressor stability can be obtained.

Accordingly, corrected-speed responsive IGV angle control is applied to operational states under which the gas generator shaft rotates at low speed (these operational states occur during operational starts, during operational stops, and during low load operation under fixed or lower load conditions), whereas control for maintaining a constant gas generator shaft rotation speed, that is, shaft rotation speed constant IGV angle control is applied to an operational state under which the gas generator shaft rotates at high speed (i.e., high load operation).

Using appropriate one of different control modes for a particular operational state in this way makes it possible to resolve the resonance problem effectively and to respond to compressor surging effectively. This means that during the gas generator shaft high-speed rotation that renders the resonance problem particularly serious, since shaft rotation speed constant IGV angle control keeps the gas generator shaft rotation speed constant, the situation where the gas generator shaft rotation speed approaches the resonance rotation speed can be avoided effectively and the resonance problem can therefore be resolved effectively. In the meantime, compressor surging that becomes a problem during the low-speed rotation of the gas generator shaft can be avoided by using corrected rotation speed responsive IGV angle control.

The present invention solves the foregoing problem in line with the concepts described above. More specifically, a twin-shaft gas turbine with a gas generator including a compressor to generate compressed air, a combustor to generate combustion gases by burning a fuel mixedly with the compressed air supplied from the compressor, and a high-pressure turbine rotationally driven by the combustion gases supplied from the combustor, the high-pressure turbine being used to generate a driving force of the compressor, is configured described below. A first control mode and a second control mode are selectively useable for control of the gas generator. In the first control mode, an IGV angle in the compressor is controlled in accordance with a corrected shaft rotation speed of the gas generator, and in the second control mode, the IGV angle is controlled to maintain a constant gas generator shaft rotation speed. Furthermore, the first control mode is used to start, to stop, and to operate the turbine under fixed or lower load conditions, and the second control mode is used under operational states other than those to which the first control mode is applied.

Under a state of high gas-generator shaft rotation speeds and small IGV angles, deterioration of performance due to a separated flow of air at a blade of the compressor is prone to occur, which, in turn, easily causes icing as well. It is preferable, therefore, that such situations be made avoidable. For these reasons, in a preferred embodiment of such twin-shaft gas turbine of the present invention as outlined above, the gas turbine allows a third control mode to intervene during a mode change between the first control mode and the second control mode, and in the third control mode, a constant IGV angle is maintained without relying upon the rotation speed of the gas generator shaft.

According to the present invention outlined above, the resonance problem arising under a high-speed rotational state of a gas generator shaft in a twin-shaft gas turbine can be resolved effectively. Effective response to compressor surging can also be implemented.

DESCRIPTION OF THE PREFERRED EMBODIMENTS

Figure 1:
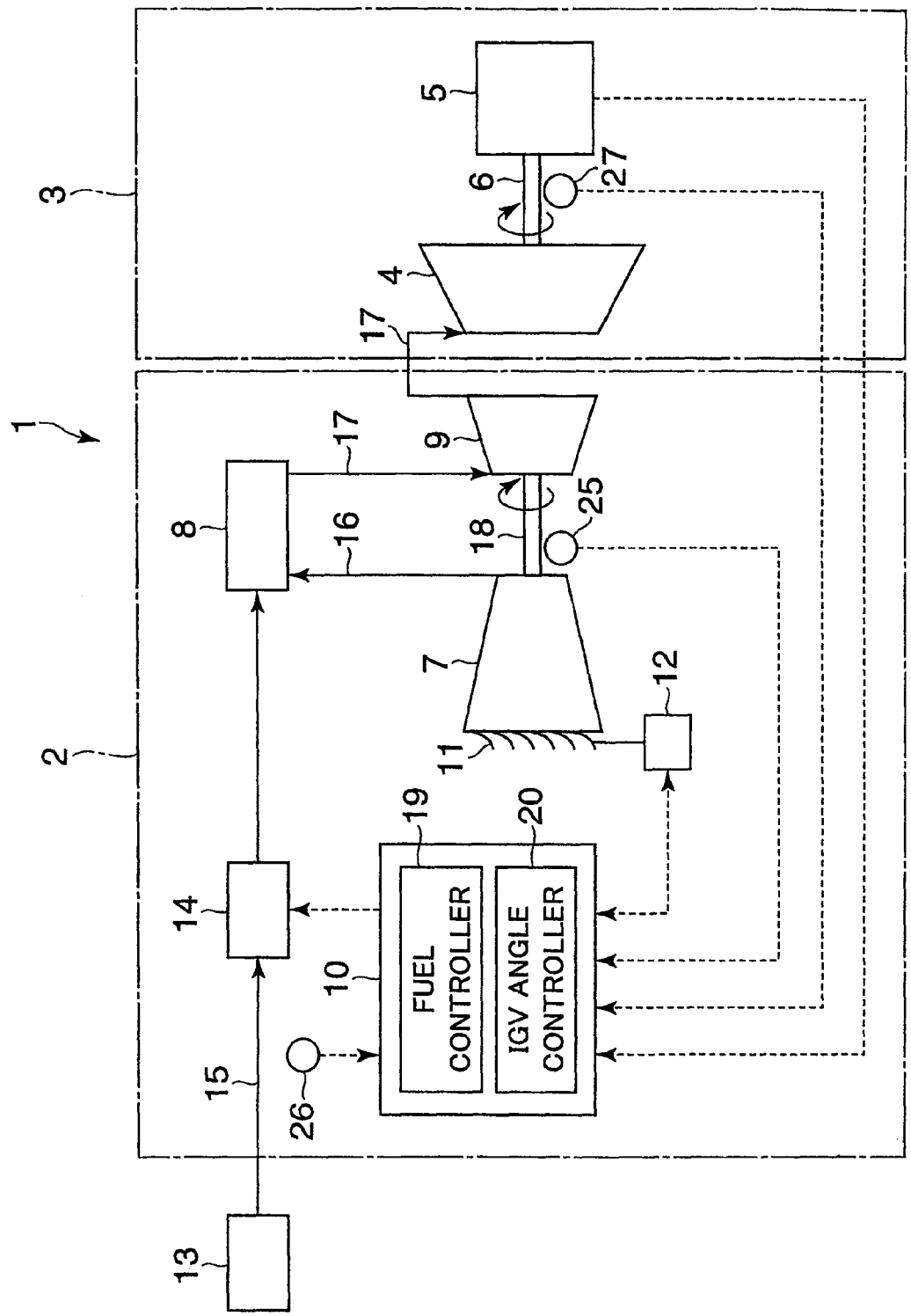
FIG. 1 is a diagram showing a configuration of a twin-shaft gas turbine according to a first embodiment.

Hereunder, embodiments of the present invention will be described. A twin-shaft gas turbine 1 according to a first embodiment is shown in schematic form in FIG. 1. The twin-shaft gas turbine 1 includes a gas generator 2 and an output turbine 3.

The output turbine 3 includes a low-pressure turbine 4 and a load 5 as its major constituent elements, the load 5 being connected to the low-pressure turbine 4 via an output turbine shaft 6 which also operates as a rotor of the turbine 4.

The gas generator 2 includes a compressor 7, a combustor 8, a high-pressure turbine 9, and a gas generator control unit 10, as its major constituent elements.

The compressor 7 generates compressed air by letting air in from the atmosphere and compressing this air. Also, the compressor 7 has an inlet guide vane (IGV) 11 at its air inlet side. The IGV 11 is constructed to make its opening angle changeable via an IGV driver 12, thus changing an air inlet rate of the compressor 7.

The combustor 8 generates combustion gases 17 by receiving a fuel 15 from a fuel supply 13 via a fuel control valve 14 and burning the fuel 15 mixedly with the compressed air 16 from the compressor 7.

The high-pressure turbine 9 adapted to transmit a driving force to the compressor 7 via a gas generator shaft 18 which is also a rotor of the turbine 9 is rotationally driven by the combustion gases 17 from the combustor 8 to generate the driving force. The combustion gases 17 that have acted upon the rotational driving of the high-pressure turbine 9 to decrease in pressure are further sent therefrom to the low-pressure turbine 4 to drive it for rotation.

The gas generator control unit 10 includes a fuel controller 19 and an IGV angle controller 20.

The fuel controller 19 provides control of the fuel control valve 14, based upon data from a rotation speed detector 27 which detects a rotation speed of the output turbine shaft 6, and upon load state data obtained about the load 5. Thus, the fuel controller 19 controls the supply of the fuel 15 from the fuel supply 13 to the combustor 8.

Figure 2:
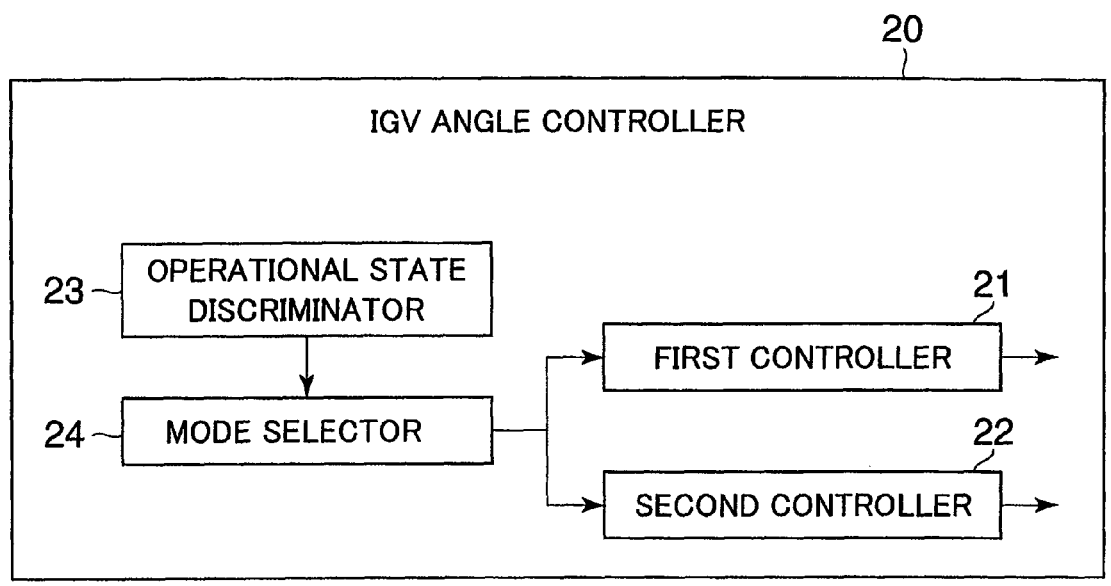
FIG. 2 is a diagram showing an IGV angle controller configuration in the first embodiment.

The IGV angle controller 20 controls the angle of the IGV 11 through the control of the IGV driver 12. An example of an IGV angle controller configuration is shown in FIG. 2. The IGV angle controller 20 in this example includes a first controller 21, a second controller 22, an operational state discriminator 23, and a mode selector 24.

The first controller 21 executes control in a first control mode. In the first control mode, the first controller 21 conducts corrected rotation speed responsive IGV angle control to adjust the IGV angle on the basis of the corrected rotation speed of the gas generator shaft 18. This corrected rotation speed of the gas generator shaft 18 is obtained by normalizing an actual rotation speed value thereof (this value is given by a speed detector 25 that detects actual rotation speeds of the gas generator shaft 18) with an atmospheric temperature value (this value is given by a thermometer 26 that measures atmospheric temperatures). More specifically, the corrected rotation speed Nt is obtained using the following expression, with the actual rotation speed being represented as N and the atmospheric temperature as T:

$$Nt = N \cdot [288.15/(273.15+T)]^{1/2}$$

The second controller 22 executes control in a second control mode. In the second control mode, the second controller 22 conducts IGV angle adjustments by shaft rotation speed constant IGV angle control to obtain a constant gas generator shaft rotation speed. This constant rotation speed by shaft rotation speed constant IGV angle control is a rated rotation speed, for example.

The operational state discriminator 23 discriminates a particular operational state on the basis of data such as the load data. More specifically, the operational state discriminator 23 discriminates whether the operational state of the turbine is a first operational state (either a starting operational state, a stopping operational state, or a low load operational state) or a second operational state (an operational state other than the first operational state, i.e., a high load operational state). This discrimination process assumes that IGV angle data on a stable operational region of the compressed air 16 is used as a measure for the discrimination between the low load operational state and the high load operational state. That is to say, an appropriate target IGV angle for a stable operational region according to particular characteristics of the compressed air 16 is set and whether the operational state is the low load operational state or the high load operational state is discriminated on the basis of the target IGV angle.

The mode selector 24 selects a control mode appropriate for discrimination results in the operational state discriminator 23. More specifically, when the discriminated operational state is the first operational state, the first controller 21 is started, and when the discriminated operational state is the second operational state, the second controller 22 is started. Briefly, the appropriate mode is selected so that corrected rotation speed responsive IGV angle control, that is, the first control mode, will be used for the first operational state, and so that shaft rotation speed constant IGV angle control, that is, the second control mode, will be used for the second control mode.

Figure 3A:
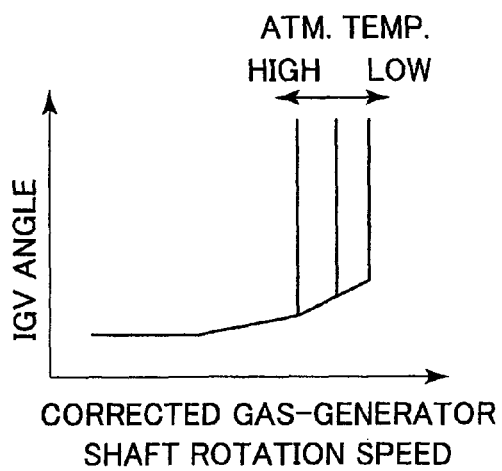
FIGS. 3A and 3B are diagrams that represent relationships of an IGV angle with respect to a corrected rotation speed and actual rotation speed of a gas generator shaft in the first embodiment.
Figure 3B:
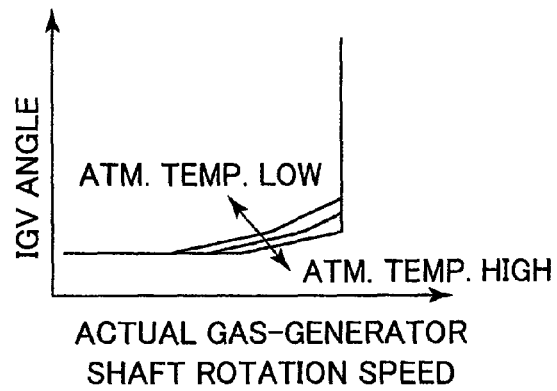

As set forth above, the IGV angle controller 20 selectively uses the corrected rotation speed responsive IGV angle control mode or the shaft rotation speed constant IGV angle control mode according to the particular operational state. A relationship between the corrected rotation speed of the gas generator shaft 18 and IGV angle under such control by the IGV angle controller 20 is represented in FIG. 3A, and a relationship between the actual rotation speed of the gas generator shaft 18 and the IGV angle, in FIG. 3B. As can be seen from these graphs, under low load conditions, lines of operation are the same, regardless of the atmospheric temperature, but under high load conditions, the corrected rotation speed changes with the atmospheric temperature. Meanwhile, however, the lines of operation under the low load conditions change with the atmospheric temperature, the rotation speed of the gas generator shaft 18 becomes constant under the high load conditions.

Use of such control allows effective resolution of the resonance problem, that is, effective reduction of an increased likelihood of damage to the turbine and/or the compressor due to the resonance arising during high-speed rotation of the gas generator shaft 18 when the rotation speed approaches the resonance rotation speed. Such control also allows effective response to compressor surging during low-speed rotation. These advantages allow resonance-associated design loads to be relieved and costs to be reduced.

Figure 4:
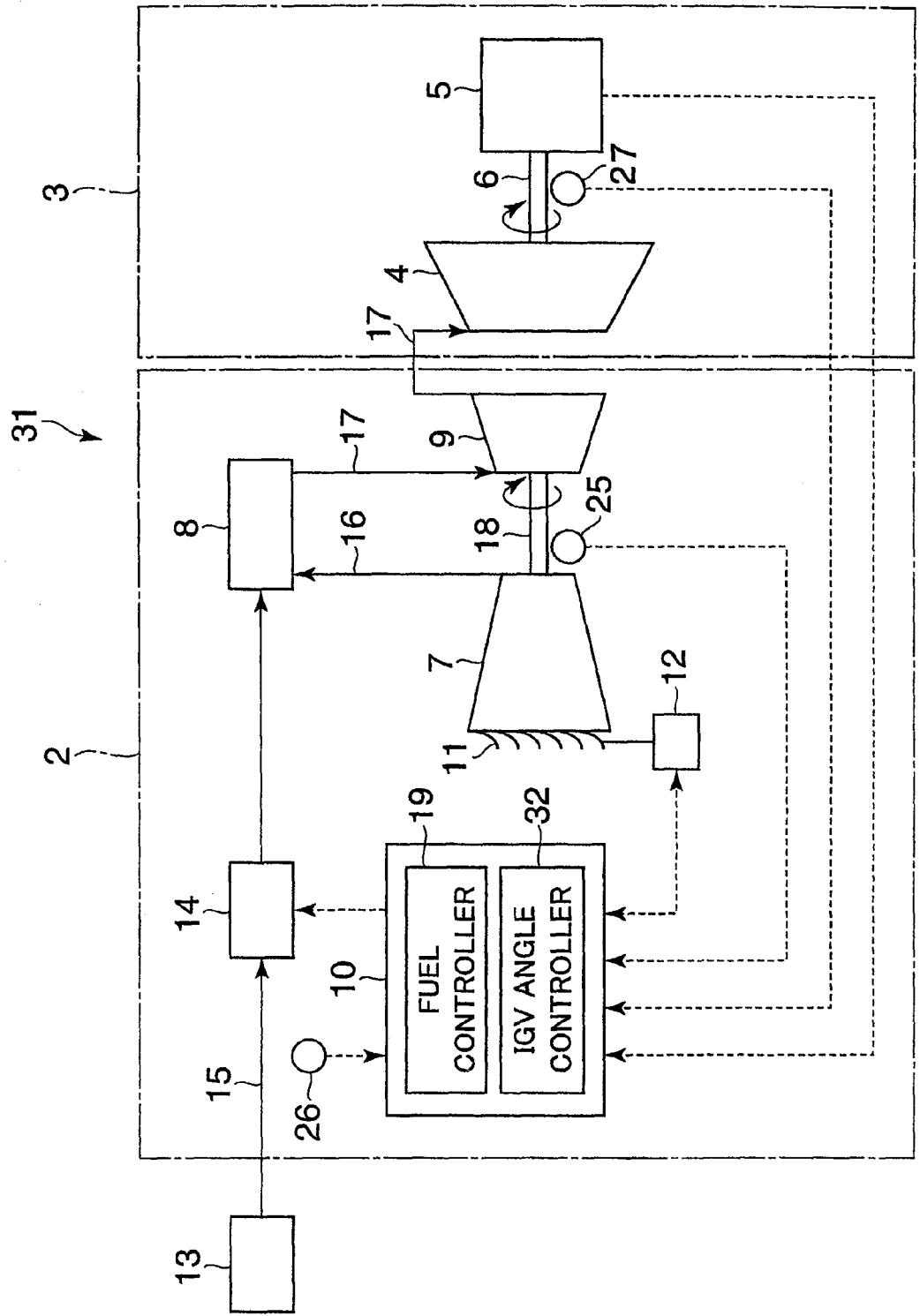
FIG. 4 is a diagram showing a configuration of a twin-shaft gas turbine according to a second embodiment.

A second embodiment is described below. A configuration of a twin-shaft gas turbine 31 according to the second embodiment is shown in schematic form in FIG. 4. The twin-shaft gas turbine 31 of the present embodiment is substantially the same as the twin-shaft gas turbine 1 of FIG. 1, except that a gas generator control unit 10 of the turbine 31 includes an IGV angle controller 32 instead of the IGV angle controller 20 in FIG. 1. Configurational features and characteristics of the twin-shaft gas turbine 31, therefore, are mainly described below, with the description of the foregoing embodiment being invoked for configurational features and characteristics common to those of the twin-shaft gas turbine 1.

Figure 5:
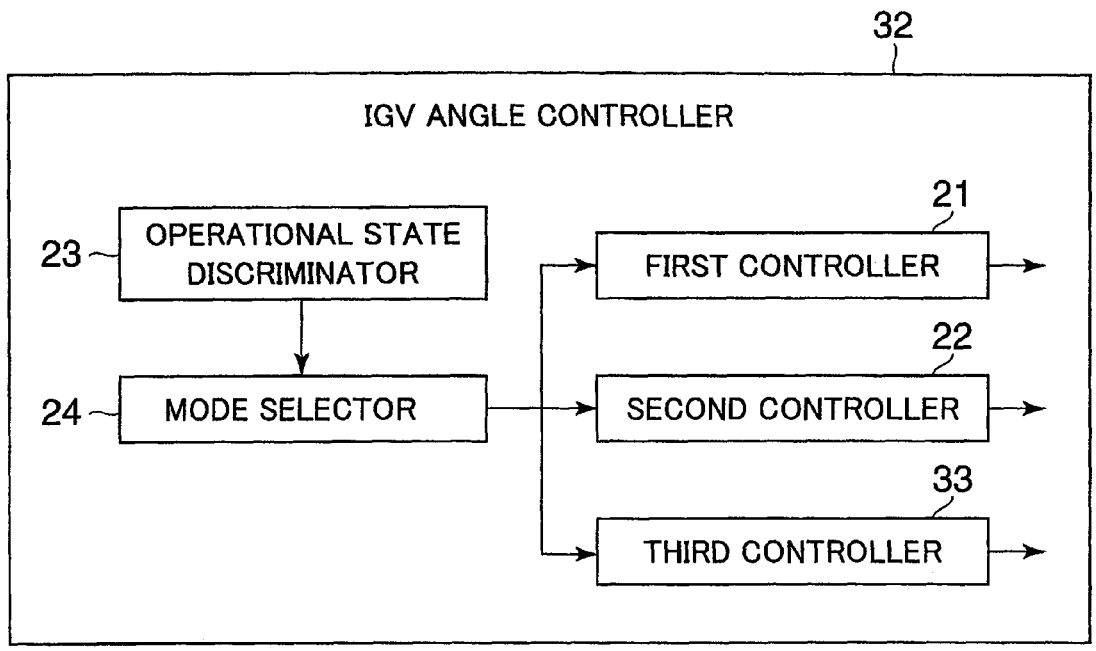
FIG. 5 is a diagram showing an IGV angle controller configuration in the second embodiment.

The IGV angle controller 32, as its configuration is shown in FIG. 5, includes a third controller 33 in addition to substantially the same first controller 21, second controller 22, operational state discriminator 23, and mode selector 24, as those of FIG. 2.

The third controller 33 executes control in a third control mode. In the third control mode, the third controller 33 conducts IGV angle constant hold control to maintain a constant IGV angle, independently of the rotation speed of the gas generator shaft 18. This third control mode of the third controller 33, that is, the IGV angle constant hold control mode is used during a mode change between the first control mode and the second control mode. This means that when the operational state discriminator 23 discriminates a shift in operational state between the first operational state and the second operational state, the third controller 33 will be started to execute the control in the IGV angle constant hold control mode.

Figure 6A:
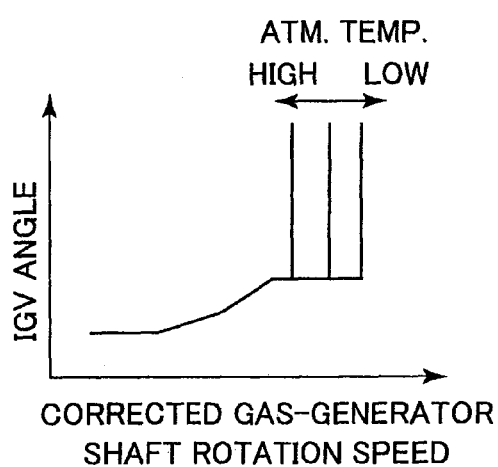
FIGS. 6A and 6B are diagrams that represent relationships of an IGV angle with respect to a corrected rotation speed and actual rotation speed of a gas generator shaft in the second embodiment.
Figure 6B:
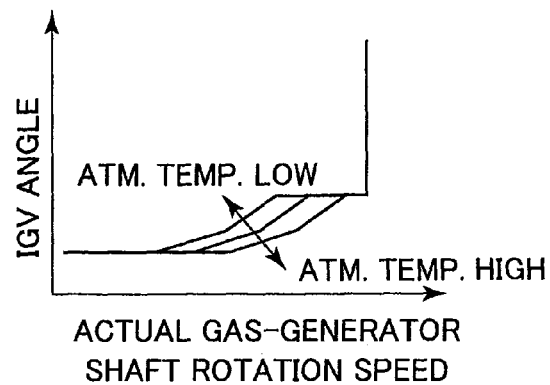
Figure 7A:
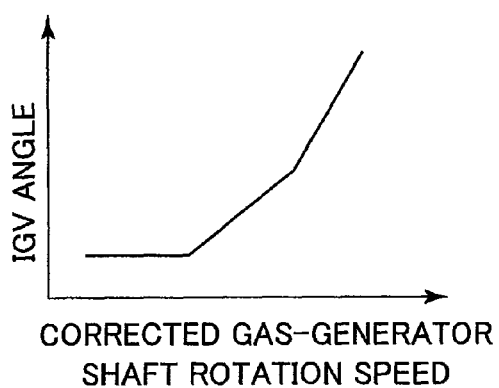
FIGS. 7A and 7B are diagrams that represent relationships of an IGV angle with respect to a corrected rotation speed and actual rotation speed of a gas generator shaft in a conventional control technique.
Figure 7B:
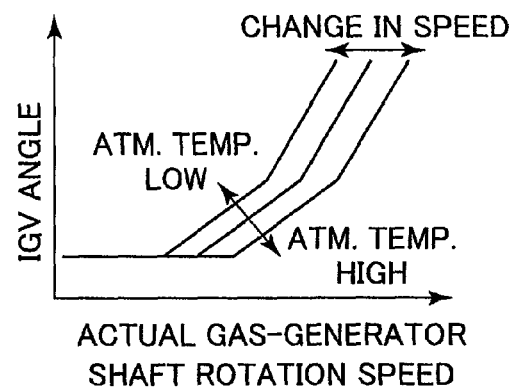

The relationship between the corrected rotation speed of the gas generator shaft 18 and IGV angle under the control of the IGV angle controller 32 is represented in FIG. 6A, and the relationship between the actual rotation speed of the gas generator shaft 18 and the IGV angle, in FIG. 6B. As can be seen from these graphs, since the control in the IGV angle constant hold control mode can also be conducted, decreases in IGV angle at high rotation speeds of the gas generator shaft can be avoided. That is to say, under the state of high gas-generator shaft rotation speeds and small IGV angles, the deterioration of performance due to the separated flow of air at the blade of the compressor 7 is prone to occur, which, in turn, easily causes icing as well. Such situations can be effectively avoided by making the third control mode intervene during a mode change between the first control mode and the second control mode. Reliability can also be improved.

While embodiments of the present invention have been described above, these embodiments are only typical examples and the invention can be embodied in various forms without departing from the scope of the invention.

What is claimed is:

1. A twin-shaft gas turbine with a gas generator, the gas turbine comprising:
   a compressor having an inlet guide vane at its air inlet side;
   a combustor for generating combustion gases by burning a fuel mixedly with the compressed air supplied from the compressor; and
   a high-pressure turbine rotationally driven by the combustion gases supplied from the combustor, the high-pressure turbine being used to generate a driving force of the compressor;
   wherein the gas turbine further comprises control means of the inlet guide vane; and
   the control means of the inlet guide vane includes,
   a first control mode in which an opening angle of the inlet guide vane is controlled on the basis of a corrected rotation speed corresponding to atmospheric temperature of the gas generator shaft which rotates at low speed,
   a second control mode in which the opening angle of the inlet guide vane is controlled to maintain a constant rotation speed of the gas generator shaft which rotates at high speed.

2. A twin-shaft gas turbine with a gas generator, the gas turbine comprising:
   a compressor having an inlet guide vane at its air inlet side;
   a combustor for generating combustion gases by burning a fuel mixedly with the compressed air supplied from the compressor; and
   a high-pressure turbine rotationally driven by the combustion gases supplied from the combustor, the high-pressure turbine being used to generate a driving force of the compressor;
   wherein the gas turbine further comprises control means of the inlet guide vane; and
   the control means of the inlet guide vane includes,
   a first control mode in which an opening angle of the inlet guide vane is controlled to avoid surging of the compressor when the gas generator shaft which rotates at low speed,
   a second control mode in which the opening angle of the inlet guide vane is controlled to avoid the resonance of the compressor when the gas generator shaft which rotates at high speed.

3. The twin-shaft gas turbine according to claim 1, wherein the gas turbine further comprises control means of the inlet guide vane; and the control means of the inlet guide vane includes,
a third control mode for maintaining a constant angle of the inlet guide vane of the compressor independently of a rotation speed of the gas generator shaft is executed during a mode change between the first control mode and the second control mode.

4. The twin-shaft gas turbine according to claim 2, wherein the gas turbine further comprises control means of the inlet guide vane; and the control means of the inlet guide vane includes,
a third control mode for maintaining a constant angle of the inlet guide vane of the compressor independently of a rotation speed of the gas generator shaft is executed during a mode change between the first control mode and the second control mode.

5. A control unit for a twin-shaft gas turbine with a gas generator, the gas turbine comprising:
a compressor having an inlet guide vane at its air inlet side;
a combustor for generating combustion gases by burning a fuel mixedly with the compressed air supplied from the compressor; and
a high-pressure turbine rotationally driven by the combustion gases supplied from the combustor, the high-pressure turbine being used to generate a driving force of the compressor;

wherein the control unit includes,
a first control mode in which an opening angle of the inlet guide vane is controlled on the basis of a corrected rotation speed corresponding to atmospheric temperature of the gas generator shaft which rotates at low speed,
a second control mode in which the opening angle of the inlet guide vane is controlled to maintain a constant rotation speed of the gas generator shaft which rotates at high speed.

6. A method for controlling operation of a twin-shaft gas turbine with a gas generator, the gas turbine comprising:
a compressor having an inlet guide vane at its air inlet side;
a combustor for generating combustion gases by burning a fuel mixedly with the compressed air supplied from the compressor; and
a high-pressure turbine rotationally driven by the combustion gases supplied from the combustor, the high-pressure turbine being used to generate a driving force of the compressor;
wherein the method includes,
controlling the opening angle of the inlet guide vane on the basis of a corrected rotation speed corresponding to atmospheric temperature of the gas generator shaft which rotates at low speed,
controlling the opening angle of the inlet guide vane to maintain a constant rotation speed of the gas generator shaft which rotates at high speed.

* * * * *